(12) United States Patent
Dirik et al.

(10) Patent No.: US 12,386,559 B2
(45) Date of Patent: Aug. 12, 2025

(54) ACCESS TRACKING IN MEMORY

(71) Applicant: Micron Technology, Inc., Boise, ID (US)

(72) Inventors: Cagdas Dirik, Indianola, WA (US);
Robert M. Walker, Raleigh, NC (US);
Elliott C. Cooper-Balis, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/432,946

(22) Filed: Feb. 5, 2024

(65) Prior Publication Data

US 2024/0176547 A1 May 30, 2024

Related U.S. Application Data

(63) Continuation of application No. 17/412,077, filed on Aug. 25, 2021, now Pat. No. 11,893,279.

(51) Int. Cl.
*G06F 3/06* (2006.01)
*G06F 12/02* (2006.01)
*G06F 12/12* (2016.01)

(52) U.S. Cl.
CPC .......... *G06F 3/0659* (2013.01); *G06F 3/0604* (2013.01); *G06F 3/0653* (2013.01); *G06F 3/0679* (2013.01); *G06F 12/0246* (2013.01); *G06F 12/12* (2013.01)

(58) Field of Classification Search
CPC .... G06F 3/0659; G06F 3/0604; G06F 3/0653; G06F 3/0679; G06F 12/12; G06F 12/0246
See application file for complete search history.

(56) References Cited

U.S. PATENT DOCUMENTS

| 7,496,711 B2 | 2/2009 | Bartley et al. |
| 9,330,736 B2 | 5/2016 | Michalak |
| 9,940,286 B2 | 4/2018 | Duluk et al. |
| 11,237,981 B1* | 2/2022 | Habusha ............ G06F 12/0835 |
| 11,467,960 B1* | 10/2022 | Dimond ............. G06F 11/3037 |
| 2008/0052488 A1* | 2/2008 | Fritz ................... G06F 12/0864 711/216 |
| 2008/0177951 A1 | 7/2008 | Bartley et al. |
| 2012/0023300 A1 | 1/2012 | Tremaine et al. |

(Continued)

OTHER PUBLICATIONS

D. Park and D. H. C. Du, "Hot data identification for flash-based storage systems using multiple bloom filters," 2011 IEEE 27th Symposium on Mass Storage Systems and Technologies (MSST), Denver, CO, USA, 2011, pp. 1-11, doi: 10.1109/MSST.2011.5937216. (Year: 2011).*

(Continued)

*Primary Examiner* — Curtis James Kortman
(74) *Attorney, Agent, or Firm* — Brooks, Cameron & Huebsch, PLLC

(57) ABSTRACT

An access tracker configured to receive a request to access a page, determine whether a page identification (ID) associated with the page is in the access tracker, increment an access count of the page in response to determining the page ID is in the access tracker, sort a number of page IDs based on an access count of each page ID, and determine whether a different page is hot or cold in response to sorting the number of page IDs.

17 Claims, 5 Drawing Sheets

(56) References Cited

U.S. PATENT DOCUMENTS

| | | |
|---|---|---|
| 2012/0272029 A1 | 10/2012 | Zhang |
| 2013/0326154 A1 | 12/2013 | Haswell |
| 2014/0281110 A1* | 9/2014 | Duluk, Jr. ............. G06F 12/123 |
| | | 711/135 |
| 2016/0103765 A1 | 4/2016 | Rastogi |
| 2018/0046383 A1* | 2/2018 | Gates .................... G06F 3/0644 |
| 2018/0136838 A1 | 5/2018 | White |
| 2019/0095109 A1 | 3/2019 | Zhou |
| 2020/0192809 A1 | 6/2020 | Mappouras |
| 2021/0263862 A1* | 8/2021 | Gupta ................. G06F 11/3452 |
| 2021/0365371 A1 | 11/2021 | Dong |
| 2022/0214825 A1 | 7/2022 | Ganguly |

OTHER PUBLICATIONS

Mayank Goswami et al., Buffered Count-Min Sketch on SSD: Theory and Experiments, arXiv, European Symposium on Algorithms (ESA 2018), pp. 1-14 https://arxiv.org/abs/1804.10673 (Year: 2018).*

* cited by examiner

ACCESS TRACKING IN MEMORY

PRIORITY INFORMATION

This application is a Continuation of U.S. application Ser. No. 17/412,077, filed on Aug. 25, 2021, the contents of which are incorporated herein by reference.

TECHNICAL FIELD

Embodiments of the disclosure relate generally to managing pages in memory, and more specifically, relate to managing pages in memory using access trackers.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
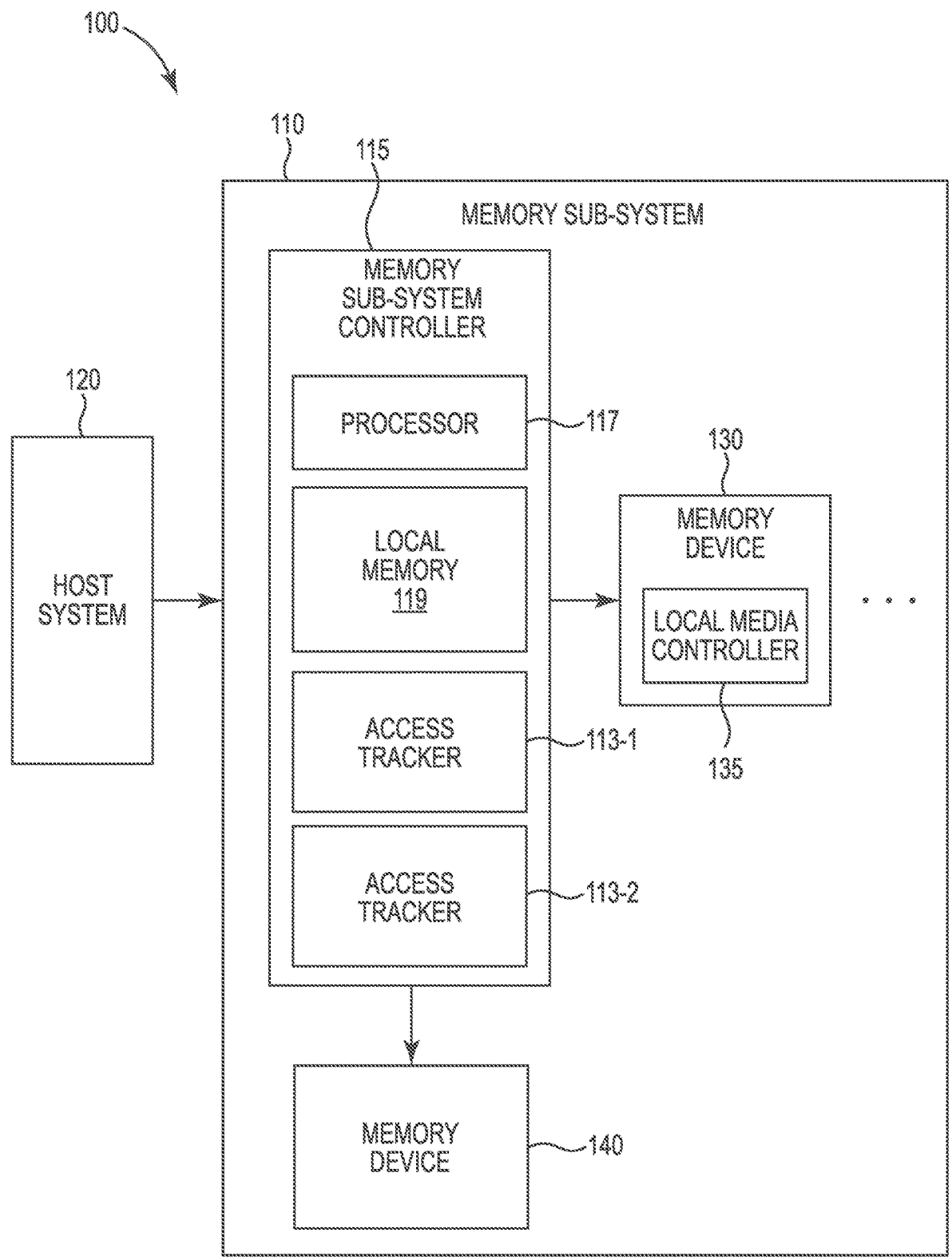
FIG. 1 illustrates an example computing system that includes a memory sub-system in accordance with some embodiments of the present disclosure.

Aspects of the present disclosure are directed to managing pages in memory, in particular to memory sub-systems that include a memory sub-system access tracker component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

As new memory systems, such as persistent memory, are developed, and higher memory capacity is desired, multi-tier memory systems have been proposed to balance performance, power consumption, capacity, and cost. Almost all multi-tier memory systems include mechanisms to identify memory accesses as frequently accessed (e.g., hot) data vs. rarely accessed (e.g., cold) data. Then hot data is stored in faster (e.g., high power consumption and lower capacity) tiers, and cold data is stored in slower (e.g., low power consumption and higher capacity) tiers.

Identifying memory accesses as hot or cold can require maintaining data structures such that for a given page and time period (e.g., recency information), a number of accesses to the page can be counted. Pages can be divided into hot and cold groups by comparing access counts of each page of a number of pages. Various data structures can be utilized for this purpose. At a minimum these data structures store a page identification (ID) (e.g., page number) and an access count. For a multiple Terabyte (TB) capacity memory system, this adds up to around 40 bits or more per entry.

Many access tracking mechanism limit the size of their data structures to a small value, which can limit their accuracy. For example, over time a higher resolution can be available because the tracking mechanism can have more access requests for pages. However, more unique pages can also be requested over time, which can increase the number of entries in the data structures. Therefore, many access tracking mechanisms limit the size of their data structures and in doing so limit their accuracy.

Aspects of the present disclosure address the above and other deficiencies by providing a number of access trackers. For example, a first access tracker can receive a request to access a page, determine whether the page identification (ID) associated with the page is in the access tracker, increment an access count of the page in response to determining the page ID is in the access tracker, sort a number of page IDs based on an access count of each page ID, and/or determine whether a different page is hot or cold in response to sorting the number of page IDs. A second access tracker can receive a request to access a page including a page ID, perform a hash function on the page ID to determine whether an access count of the page is in a specific index in an array of counters of the second access tracker, access the access count of the page, transmit the access count of the page to a different tracker (e.g., first access tracker), and/or remove the access count of the page from the second access tracker.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include access tracker 113-1 and/or access tracker 113-2. Although not shown in FIG. 1 so as to not obfuscate the drawings, the access tracker 113-1 and/or the access tracker 113-2 can include various circuitry to facilitate performance of tracking access counts to manage pages, as described herein. In some embodiments, the access tracker 113-1 and/or the access tracker 113-2 can include special purpose circuitry in the form of an ASIC, FPGA, state machine, and/or other logic circuitry that can allow the access tracker 113-1 and/or the access tracker 113-2 to orchestrate and/or perform operations described herein involving the memory device 130 and/or the memory device 140.

In some embodiments, the memory sub-system controller 115 includes at least a portion of the access tracker 113-1 and/or the access tracker 113-2. For example, the memory sub-system controller 115 can include a processor 117 (processing device) configured to execute instructions stored in local memory 119 for performing the operations described herein. In some embodiments, the access tracker 113-1 and/or the access tracker 113-2 is part of the host system 120, an application, or an operating system.

In a non-limiting example, an apparatus (e.g., the computing system 100) can include the access tracker 113-1 and/or the access tracker 113-2. The access tracker 113-1 and/or the access tracker 113-2 can be resident on the memory sub-system 110. As used herein, the term "resident on" refers to something that is physically located on a particular component. For example, the access tracker 113-1 and/or the access tracker 113-2 being "resident on" the memory sub-system 110 refers to a condition in which the hardware circuitry that comprises the access tracker 113-1 and/or the access tracker 113-2 is physically located on the memory sub-system 110. The term "resident on" can be used interchangeably with other terms such as "deployed on" or "located on," herein.

Figure 2:
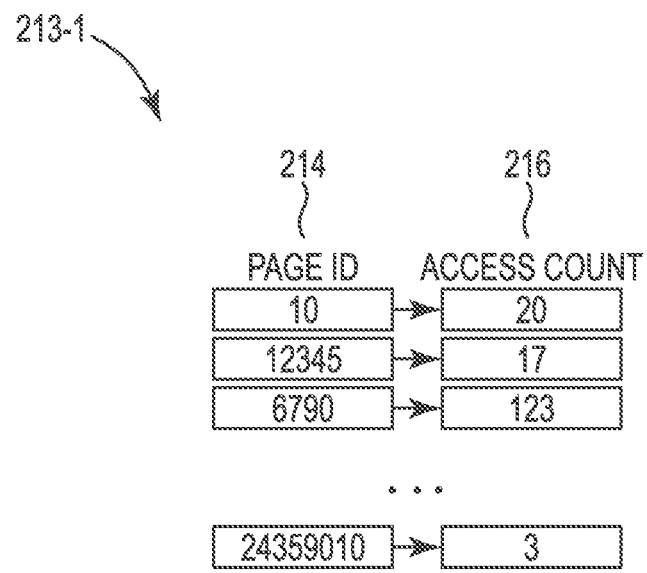
FIG. 2 illustrates an example of an access tracker in accordance with some embodiments of the present disclosure.

FIG. 2 illustrates an example of an access tracker 213-1 in accordance with some embodiments of the present disclosure. Access tracker 213-1 can correspond to access tracker 113-1 of FIG. 1. The access tracker 213-1 can include hardware, software, and/or firmware that is configured to enable the access tracker 213-1 to track access counts 216 associated with a number of page IDs 214. The number of pages corresponding to the page IDs 214 can be stored in a memory device (e.g., memory device 140 in FIG. 1).

A counter can be incremented for each page accessed, which can be executed using a software map and/or a content-addressable memory (CAM), for example. At any point in time, an access count of each page can be determined because the access tracker 213-1 stores the page ID 214 and the access count 216 of a number of pages.

In some embodiments, the access tracker 213-1 can receive a request to access a page. The request can include a page ID 214 associated with the page. For example, the page ID requested can be "10". In response to receiving the request, the access tracker 213-1 can determine whether the page ID is stored in the access tracker 213-1 by comparing the page ID "10" to the number of page IDs 214. If the page ID matches one of the number of page IDs 214, an access count of the page can be incremented via a counter. For example, if one of the number of page IDs 214 is "10", the access count of page ID "10" can be changed from "20" to "21".

The number of pages can be sorted by access counts 216 to determine which pages are hot and which pages are cold. In some examples, the page IDs 214 can be sorted from most frequently accessed to least frequently accessed. A page can be determined to be hot or cold depending on where the page is after being sorted and/or in response to an access count of the page meeting a criterion (e.g., being below a threshold count).

Over time an access count of some or all of the number of pages can continue to increase. Accordingly, the access tracker 213-1 can change the criterion (e.g., threshold count) to follow this increase and/or decrement the access count of each page periodically and/or in response to the access count of a page being above a particular number so that not all pages will be determined to be hot.

Once a page is determined to be hot or cold, the access tracker 213-1 can perform a number of operations. For example, the access tracker 213-1 can transmit whether a page is hot or cold to a host or remove a page ID and its corresponding access count in response to determining the page is cold. In some embodiments, a memory device (e.g., memory device 104 in FIG. 1) can evict the page in response to the access tracker 213-1 determining that the page is cold.

Figure 3:
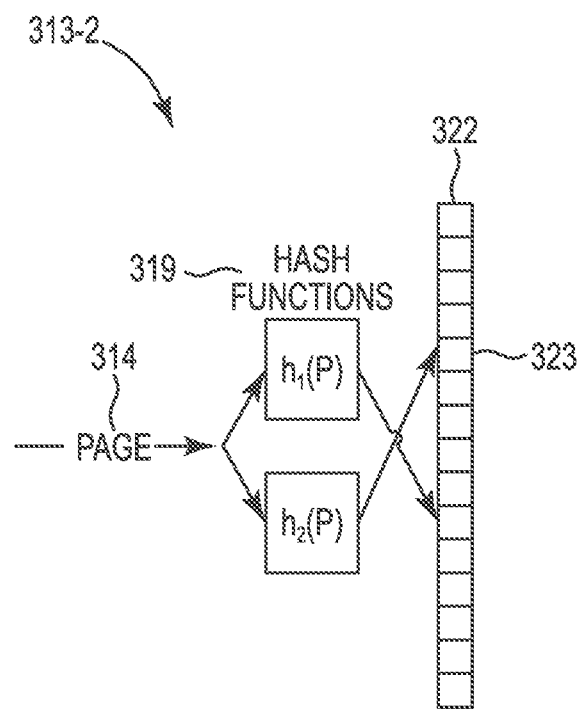
FIG. 3 illustrates an example of an access tracker in accordance with some embodiments of the present disclosure.

FIG. 3 illustrates an example of an access tracker 313-2 in accordance with some embodiments of the present disclosure. Access tracker 313-2 can correspond to access tracker 113-2 of FIG. 1. The access tracker 313-2 can include hardware, software, and/or firmware that is configured to enable the access tracker 313-2 to track access counts. The number of pages corresponding to the access counts can be stored in a memory device (e.g., memory device 130 in FIG. 1).

In some embodiments, the access tracker 313-2 can receive a request to access a page. The request can include a page ID 314 associated with the page. In response to receiving the request, the access tracker 313-2 can perform a hash function 319 on the page ID 314 to determine whether an access count of the page is in a specific index 323 in an array of counters 322 of the access tracker 313-2. In a number of embodiments, a bloom filter operation including the hash function 319 can be used to determine whether a page ID is in the access tracker 313-2.

In response to the access tracker 313-2 determining the page ID is in the access tracker 313-2, the access tracker 313-2 can access the access count of the page, transmit the access count of the page to a different access tracker (e.g., access tracker 213-1 in FIG. 2), and/or remove the access count of the page from the access tracker 313-2. In some embodiments, an access count of a page can be removed from the access tracker 313-2 in response to the access count being zero.

An access count 316 can be added to the access tracker 313-2. For example, the access tracker 313-2 can receive a page ID and a corresponding access count of a page. In some examples, the page ID and the corresponding access count of the page can be from a different access tracker (e.g., access tracker 213-1 in FIG. 2). The access tracker 313-2 can perform a hash function 319 on the page ID 314 and store the access count of the page.

Over time an access count of some or all of the number of pages can continue to increase. Accordingly, the access tracker 313-2 can decrement the access count of each page periodically (e.g., particular period of time passing) and/or in response to the access count of a page being above a particular number so that not all pages will be hot. In some examples, the particular period of time can be modified based on one or more commands from a host. For example, if a host is frequently accessing different pages, then the access tracker 313-2 can increase the period of time and/or if the host is frequently accessing the same pages, then the access tracker 313-2 can decrease the period of time.

Figure 4:
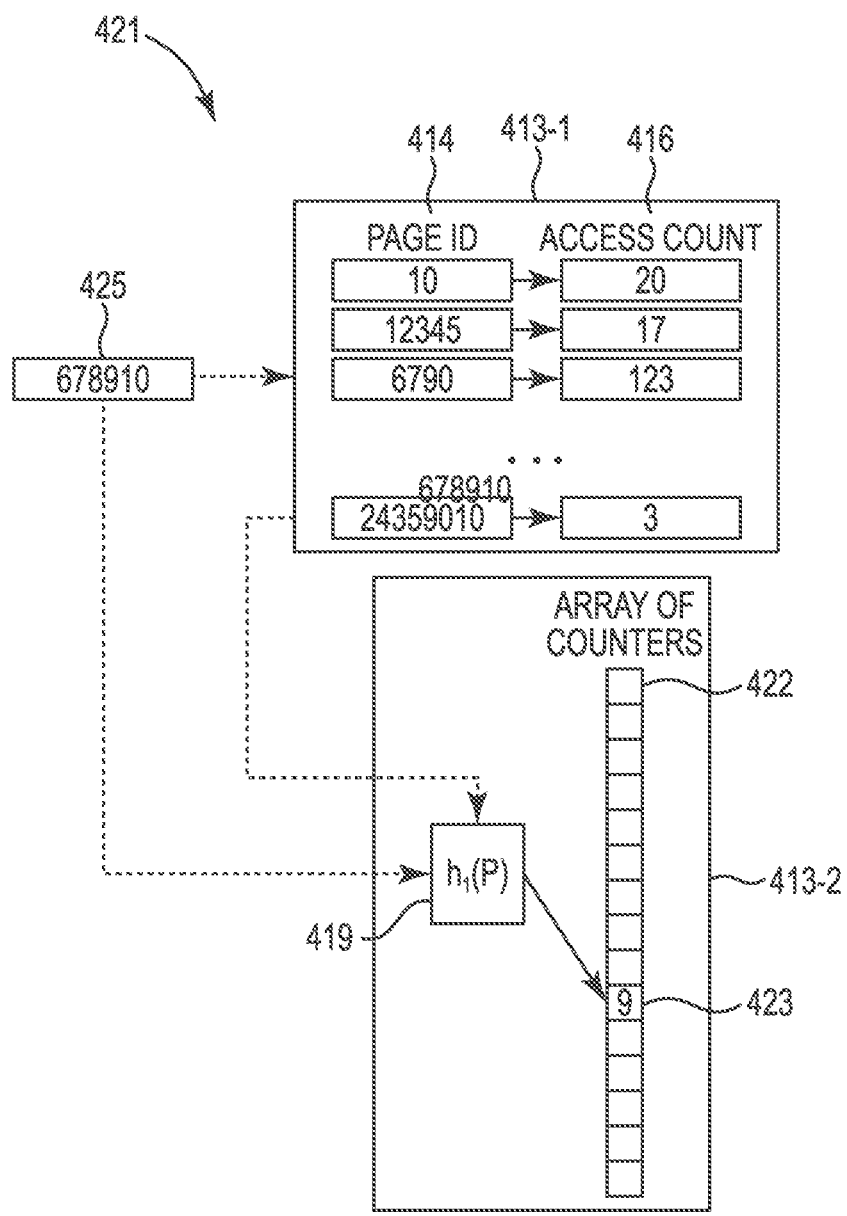
FIG. 4 is a flow diagram corresponding to managing pages in memory using access trackers in accordance with some embodiments of the present disclosure.

FIG. 4 is a flow diagram 421 corresponding to managing pages in memory using access trackers 413-1 and/or 413-2 in accordance with some embodiments of the present disclosure. When a request to access a page 425 is received, both access tracker 413-1 and access tracker 413-2 can check to see if they have the access count associated with that page.

Checking the access tracker 413-1 can include a search operation which can use hardware, for example a CAM, and/or software, for example a map. If the page ID 414 is in access tracker 413-1, then the page associated with the page ID 414 has been recently accessed and the corresponding access count 416 can be incremented. For example, if the page ID 414 is "6790", the access count 416 can be changed from "123" to "124".

Checking the access tracker 413-2 can include performing a hash function 419 on the page ID and accessing a specific index 423 in an array of counters 422. If the page ID is in access tracker 413-2, then the page associated with the page ID was accessed in the past but has not been accessed recently. In a number of embodiments, the access count of the page can be transmitted from access tracker 413-2 to access tracker 413-1 in response to receiving the request to access the page 425.

The access tracker 413-1 can receive the access count 416, store the access count 416, and increment the access count 416. For example, as illustrated in FIG. 4, the access tracker 413-1 can store page ID "678910" and increment its corresponding access count 416 from "9" to "10".

If the access tracker 413-1 is full when the access count 416 is transmitted to the access tracker 413-1, the access tracker 413-1 can transmit and remove a different access count 416. For example, as illustrated in FIG. 4, the access tracker 413-1 can remove page ID "24359010" and replace it with page ID "678910". In some approaches, the access tracker 413-1 can sort the page IDs 414 based on access counts 416 and determine the page ID 414 with the lowest access count 416. The page ID 414 with the lowest access count 416 can be removed from the access tracker 413-1. The page associated with the lowest access count 416 can be erased from a first memory (e.g., memory device 140) and stored in a second memory (e.g., memory device 130).

The different access count can be received by the access tracker 413-2 and entered into the access tracker 413-2 with its current access count. For example, access tracker 413-2 can receive page ID "678910" and its corresponding access count. The access tracker 413-2 can perform a hash function 419 on page ID "678910" and store its corresponding access count within an index in the array of counters 422.

Figure 5:
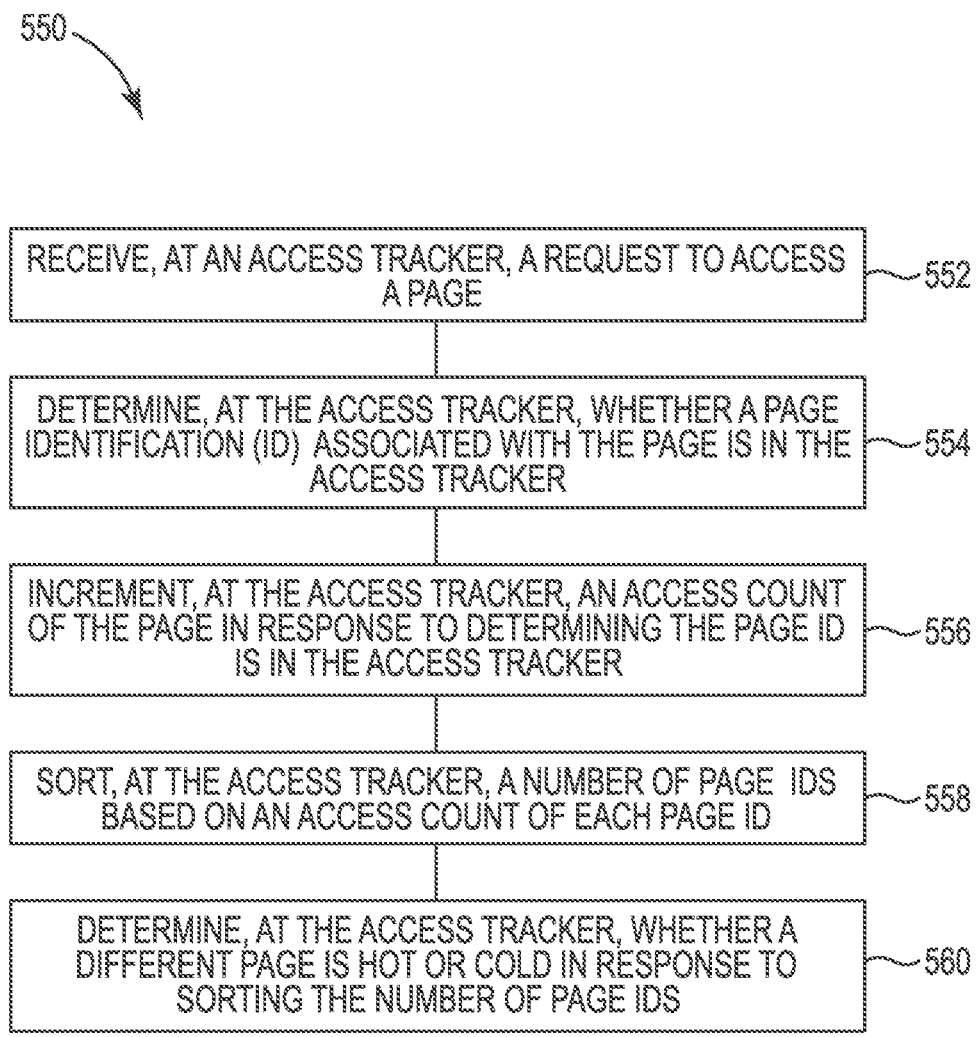
FIG. 5 is a flow diagram of a method associated with access tracking in memory in accordance with some embodiments of the present disclosure.

FIG. 5 is a flow diagram of a method 550 associated with access tracking in memory in accordance with some embodiments of the present disclosure. The method 550 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the access tracker 113-1 of FIG. 1, the access tracker 213-1 of FIG. 2, and/or the access tracker 413-1 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 552, a request to access a page can be received at an access tracker. The request can include a page ID associated with the page. The request can also be received at a different access tracker.

At operation 554, whether a page ID associated with the page is in the access tracker can be determined. The access tracker can compare the page ID associated with the page to a number of page IDs stored in the access tracker.

At operation 556, an access count of the page can be incremented in response to determining the page ID is in the access tracker. If the page ID associated with the page matches one of the number of page IDs stored in the access tracker, the page ID is in the access tracker.

At operation 558, a number of page IDs can be sorted based on an access count of each page ID. For example, the access tracker can sort the number of page IDs from highest access count to lowest access count.

At operation 560, whether a different page is hot or cold can be determined in response to sorting the number of page IDs. A hot page can have a higher access count and/or a cold page can have a lower access count, for example.

Figure 6:
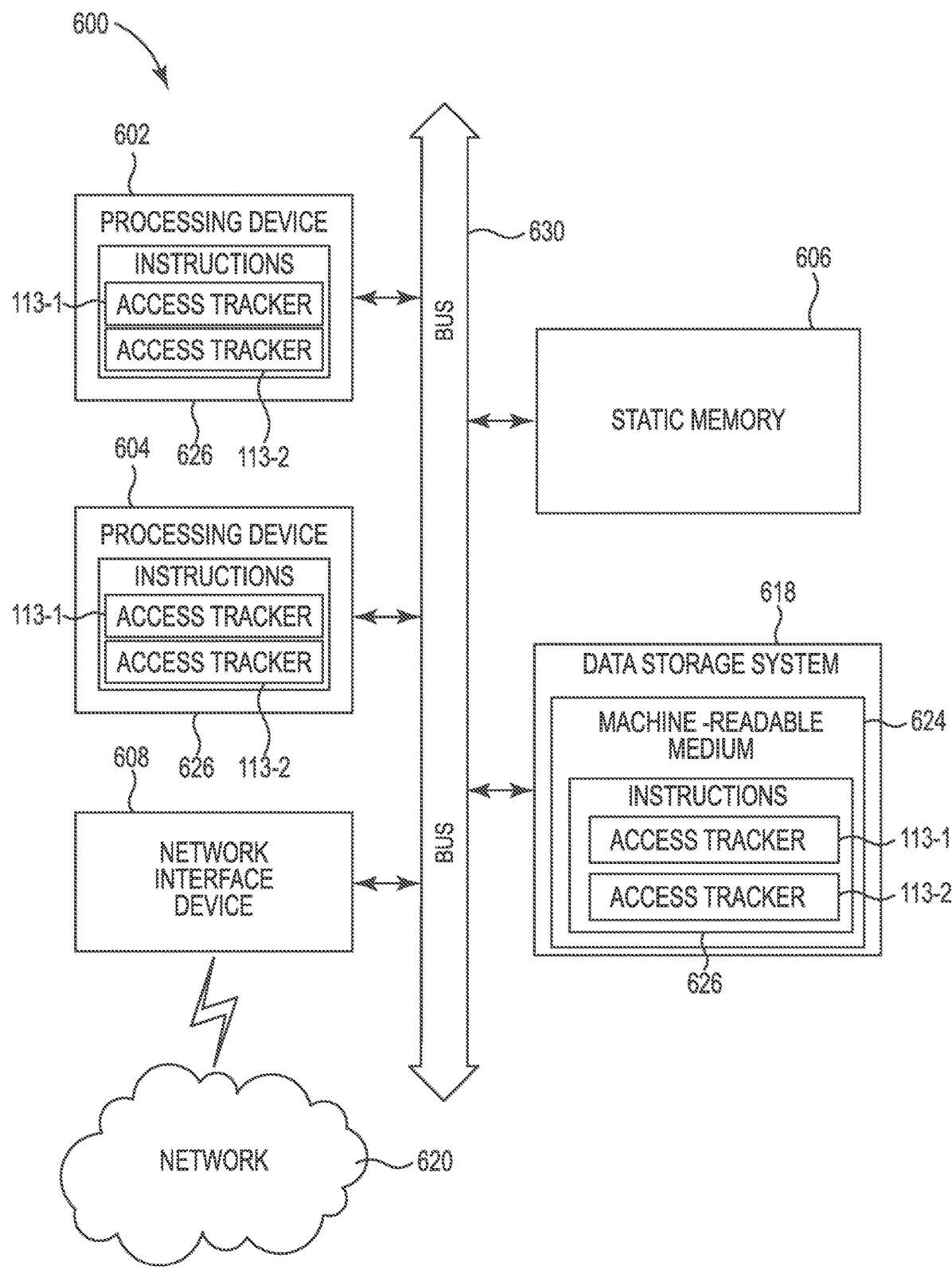
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the access tracker 113-1 and/or the access tracker 113-2 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an access tracker (e.g., the access tracker 113-1 and/or the access tracker 113-2 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
a first access tracker;
a second access tracker; and
a processor configured to:
   determine an access count of a page ID with a lowest access count in the first access tracker;
   erase a page associated with the lowest access count;
   transmit the access count of the page ID with the lowest access count to the second access tracker in response to determining the page ID has the lowest access count; and
   perform a hash function on the page ID with the lowest access count.

2. The apparatus of claim 1, wherein the processor is configured to remove the access count of the page ID with the lowest access count from the first access tracker.

3. The apparatus of claim 1, wherein the processor is configured to sort a number of page IDs in the first access tracker based on access counts to determine the access count of the page ID with the lowest access count in the first access tracker.

4. The apparatus of claim 1, comprising a memory sub-system controller comprising the first access tracker and the second access tracker.

5. The apparatus of claim 4, comprising a first memory device coupled to the memory sub-system controller.

6. The apparatus of claim 5, comprising a second memory device coupled to the memory sub-system controller.

7. The apparatus of claim 6, wherein the processor is configured to store the page associated with the lowest access count in the second memory device.

8. An apparatus, comprising:
a first access tracker;
a second access tracker; and
a processor configured to:
   receive a first access count at the first access tracker;
   remove a second access count of a page ID with a lowest access count in the first access tracker in response to the first access tracker being full;
   erase a page associated with the lowest access count;
   transmit the second access count of the page ID with the lowest access count to the second access tracker in response to the first access tracker being full; and
   perform a hash function on the page ID with the lowest access count.

9. The apparatus of claim 8, wherein the processor is configured to replace the second access count of the page ID with the lowest access count with the first access count in the first access tracker.

10. The apparatus of claim 8, wherein the first access count is received at the first access tracker in response to receiving a request to access a page.

11. The apparatus of claim 10, wherein the first access count is transmitted from the second access tracker.

12. The apparatus of claim 8, wherein the processor is configured to increment the first access count.

13. The apparatus of claim 8, wherein the processor is configured to enter the second access count of the page ID with the lowest access count into the second access tracker.

14. A system, comprising:
a host; and
a memory sub-system comprising a controller, wherein the controller is configured to receive commands from the host, and wherein the controller comprises:
   a first access tracker;
   a second access tracker; and
   a processor configured to:
      remove an access count of a page ID with a lowest access count in the first access tracker in response to the first access tracker being full;
      erase a page associated with the lowest access count;
      transmit the access count of the page ID with the lowest access count to the second access tracker in response to the first access tracker being full; and
      perform a hash function on the page ID with the lowest access count.

15. The system of claim 14, wherein the second access tracker is configured to receive the access count of the page ID with the lowest access count.

16. The system of claim 14, wherein the processor is configured to store the access count of the page ID with the lowest access count in an array of counters.

17. The system of claim 14, wherein the memory sub-system further comprises:
a first memory device configured to erase a page associated with the lowest access count; and
a second memory device configured to store the page associated with the lowest access count.

* * * * *